July 22, 1947.  J. K. MORRIS  2,424,492
BUFFER FOR LONGITUDINALLY DRIVEN MEMBERS
Original Filed March 1, 1943   2 Sheets-Sheet 1
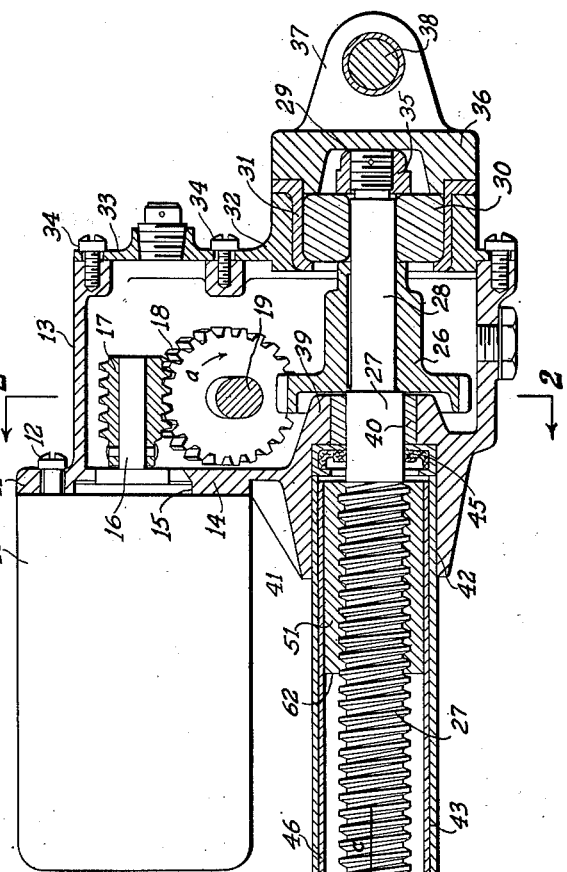
Fig. 1
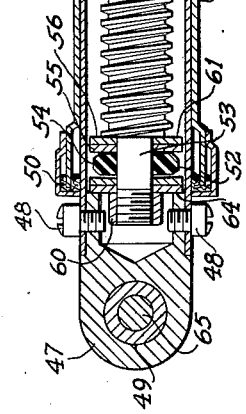
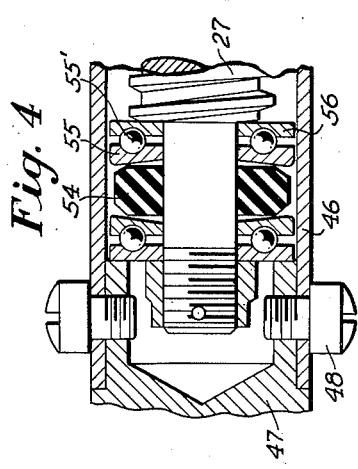
Fig. 4
*Inventor:*
JOHN K. MORRIS
By *James M. Abbott*
   *Attorney*

July 22, 1947.    J. K. MORRIS    2,424,492
BUFFER FOR LONGITUDINALLY DRIVEN MEMBERS
Original Filed March 1, 1943    2 Sheets-Sheet 2
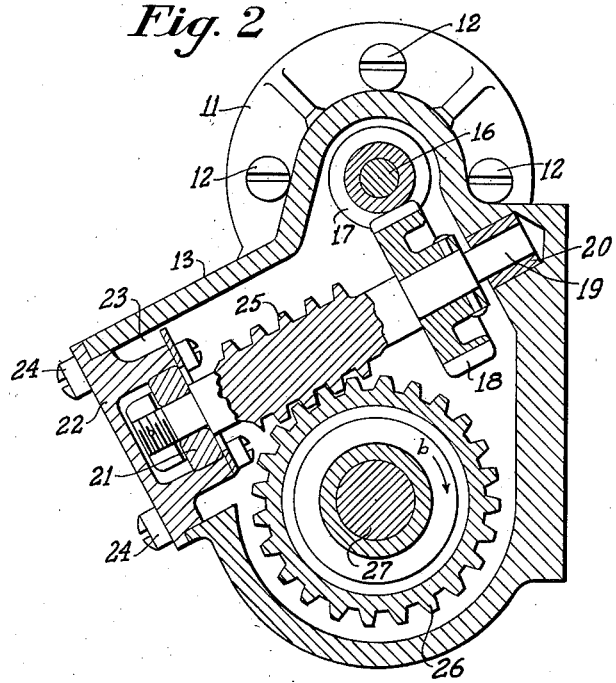
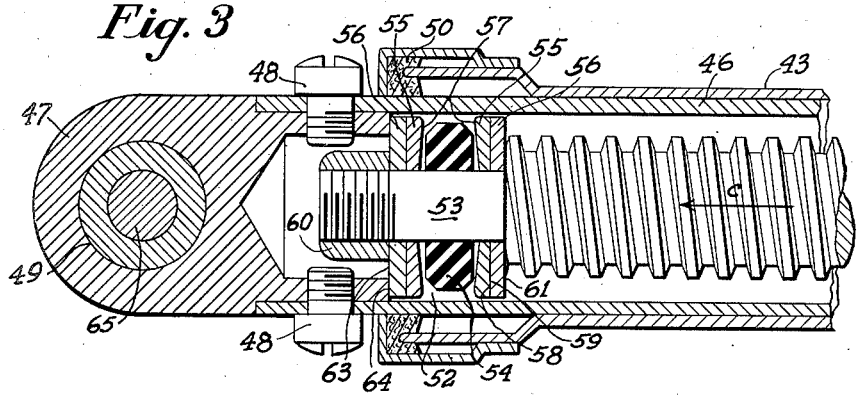
Inventor:
JOHN K. MORRIS
By James M. Abbett
Attorney Patented July 22, 1947

2,424,492

UNITED STATES PATENT OFFICE 2,424,492

BUFFER FOR LONGITUDINALLY DRIVEN MEMBERS

John K. Morris, Los Angeles, Calif.

Original application March 1, 1943, Serial No. 477,669. Divided and this application April 11, 1944, Serial No. 530,535

5 Claims. (Cl. 74—424.8)

1

This invention relates to a driving means and particularly pertains to a buffer for longitudinally driven members and is a division of my co-pending application Serial No. 477,669, entitled "Gear power unit," filed by me March 1, 1943.

In the operation of various types of mechanism it is desirable to provide a mechanical structure by which a rotating drive motion will be translated into a lineal movement of a driven member, and between which drive and driven elements a suitable power increase will be obtained. Such structures are of particular value at the present time for remotely controlling parts of airplanes, as for example the control flaps of the airplanes by which the wings are trimmed. In such structures an individual drive motor is provided, assembled with a housing within which a train of rotary gears is mounted and through which gears a reciprocating driven shaft is actuated, the motor circuit being controlled from the instrument panel of the airplane. In view of the fact that the motor and gear unit may be disposed at points remote from the control switch, and that the operation of the unit cannot be observed, it often occurs that the driving motor will be operating at high speed when the reciprocating driven shaft has reached the end of its stroke, with the result that the parts of the structure may be jammed or broken.

It is the principal object of the present invention, therefore, to provide a buffer structure interposed between a relatively fixed support and a longitudinally driven member, whereby the driven member may be restrained in operation at the end of its stroke to bring it to rest without damage to the relatively movable parts.

The present invention contemplates the provision of a housing within which a member longitudinally reciprocates while held against rotation, said reciprocating member carrying a nut engaging a rotatable screw extending longitudinally thereof, the screw being fitted with buffer means adapted to be engaged by stop shoulders adjacent opposite ends of the reciprocating member, whereby the reciprocating member will be restrained in its movement at opposite ends of its stroke in a manner to absorb the force exerted longitudinally in driving the reciprocating member.

The invention is illustrated by way of example in the accompanying drawings in which:

Figure 1 is a view in central longitudinal section through the gear power unit with which the present invention is concerned, and discloses the reciprocating driven member and the drive therefor.

Fig. 2 is a view in transverse section through the housing of the structure showing the rotary gear train as seen on the line 2—2 in Fig. 1.

Fig. 3 is an enlarged fragmentary view in section and elevation showing the tubular case and the outer end of the operating connection through the reciprocating member.

Fig. 4 is a fragmentary view in longitudinal section showing a modified form of buffer including anti-friction bearings.

Referring more particularly to the drawings, a type of structure is shown with which the buffer is intended to operate and in which drawings 10 indicates a driving motor. This motor is here shown as being an electric motor and it is of course controlled by a suitable electric circuit and electric switch. The switch is disposed at a point remote from the unit with which the present invention is concerned. It is understood that any other type of prime motor might be used if desired. The motor is mounted upon a bolting flange 11 and is secured in place by screws 12. The bolting flange is part of a gear case 13. This gear case has a forward wall 14 formed with an opening 15 through it in axial alignment with the motor 10. The drive shaft 16 of the motor extends through this opening and carries a driving pinion 17. This pinion is a worm which is in mesh with a worm wheel 18. The worm wheel 18 is mounted upon a shaft 19 which is disposed at an angle to horizontal, and thus makes it possible for the gear case 13 to be of unusually small dimensions while accommodating various gears to be hereinafter described. The shaft 19 is mounted at its uppermost end in a bearing 20 and at its lowermost end in a bearing structure 21. The bearing structure 21 is directly included within a cap 22 secured within a bore 23 of the housing 13 by cap screws 24. Mounted upon the shaft 19 or formed integral therewith is a worm 25. This is in mesh with a worm wheel 26. The worm wheel 26 is secured upon a longitudinally extending driven shaft 27.

The driven shaft 27 is here shown as disposed in the same axial plane with the drive shaft 16 and is parallel thereto. The shaft is of considerable length as compared with the length of the shaft 16 and the motor 10 and extends forwardly of the motor. For convenience is description only, it is to be understood that the motor 10 is disposed horizontally, and that the entire unit functions with the motor 10 and the shaft 27 lying in parallel horizontal planes. It is understood, however, that the unit may be disposed in any required position in actual operation.

The shaft 27 has a reduced portion 28 which terminates in a threaded end 29, and a suitable anti-friction bearing 30 is mounted on the reduced portion 28 and is carried within a cage 31. The cage 31 is mounted within a bearing portion 32 of a cover plate 33, which is secured to the gear case 13 by cap screws 34 and is disposed parallel to the front plate 14 of the gear case. The worm gear 26 is mounted upon the reduced portion of the driven shaft 27 and is keyed with relation thereto. A nut 35 engages the threaded end 29 of the shaft and supports the shaft with relation to the bearing 30.

Secured over the end of the bearing portion 32 of the cover plate 33 is a cap 36. This is formed with a lug 37 to receive pivot pin 38 by which a suitable connecting member (not shown) is attached to the gear case and either supports the case or provides an operating connection therewith.

The forward face 14 of the gear case 13 is formed with a tubular bearing portion 39 through which the shaft 27 extends. Anti-friction bearings 40 are mounted within this tubular portion and support the shaft. The position of these bearings is slightly in advance of the reduced portion 28 of the shaft.

Extending outwardly from the front face of the wall 14 of the gear case 13 is a boss 41. Secured firmly within the bore 42 of the boss is a tubular housing 43 which is rigidly supported in position and throughout the length of which a threaded portion 44 of the driven shaft 27 extends. At the inner end of the tubular housing 43 and within the bore 42 is an annular packing ring 45 which forms a fluid-tight seal around the driven shaft 27 and prevents leakage of the grease or other lubricant with which the gear case 13 is packed. Reciprocably mounted within the tubular housing and around the portion 44 of the driven shaft 27 is a thrust sleeve 46. This sleeve has a sliding fit in relation to the bore of the tubular housing 43. The outer end of the thrust sleeve receives a yoke 47 which is held in place by cap screws 48. This yoke is formed with a transverse bore 49 to receive a suitable connecting pin by which the yoke is attached to a device to be actuated, such for example as a wing flap (not shown in the drawing).

The outer end of the tubular housing is formed with a packing gland 50 which circumscribes the thrust sleeve 46 and forms a fluid seal therewith. The inner end of the thrust sleeve is formed with a tubular nut 51 which is secured to the sleeve by any suitable means, such as welding. This nut has a central threaded bore engaging threads on the section 44 of the driven shaft 27. Thus, as the shaft 27 is rotated the nut will move therealong and will simultaneously reciprocate the thrust sleeve 46. It will be evident that as the shaft 27 rotates to move the thrust sleeve 46 to the extreme end of its stroke in either direction, the shaft 27 may possibly continue to rotate and exert a longitudinal movement upon the thrust sleeve 46, since the circuit of the motor 10 may still be closed. In order to resist this movement a snubber structure is provided, as generally indicated at 52. This structure is mounted upon a reduced end portion 53 of the section 44 of the driven shaft 27 and includes a deformable washer 54 disposed between sets of washers 55 and 56.

The deformable element 54 is preferably made of some synthetic rubber, such as "neoprene." The washers 55, directly contacting the opposite sides of the "neoprene" disc or ring, are preferably formed of brass or bronze. The opposing faces of the washers 55 are concave, as indicated at 57, and the diameter of the washers 55 is greater than the diameter of the "neoprene" disc 54, for a purpose to be hereinafter described. The outer faces of the discs 55, as indicated at 58, are flat and in planes normal to the longitudinal axis of the shaft 27. Similar contiguous flat faces 59 are formed upon the discs 56. These discs are preferably made of steel, and the contiguous faces 58 and 59 are ground smooth. A film of grease is disposed between the contiguous faces 58 and 59 to facilitate in relative rotation of the discs 55 and 56. A nut 60 is threaded onto the outer end of the portion 53 of the shaft 27 and holds the members 54, 55 and 56 in assembled relation to each other upon the shaft. Attention is directed to the fact that the diameters of the discs 55 and 56 are larger than the diameter of the threaded portion 44 of the shaft 27, and that they are also larger than the outside dimensions of the nut 60. The innermost disc 56 thus presents an inner face 61 to end face 62 of the nut 51 which is assembled with the thrust sleeve 46. The outer face 63 of the outer disc 56 may be encountered by a stop face 64 formed as a part of the yoke 47, as shown in Fig. 1 of the drawings. It is to be understood that the connection between the yoke 47 and the member operated by the yoke, and which is attached by a pin 65, holds the yoke and the thrust sleeve 46 against rotation. This likewise acts to hold the nut 51 against rotation, so that rotation of the driven shaft 27 will impart longitudinal movement to the nut 51 and the thrust sleeve 46.

When it is desired to use the device as here shown, the parts are built and assembled as described in the foregoing specification. After the structure has been assembled as shown, the motor 10 may be operated. This will impart rotation to the drive shaft 16 and the worm 17, which in turn will rotate the worm gear 18 in the direction of the arrow a, as shown in Fig. 1. The worm 25 will then be driven and will impart rotation to the worm wheel 26 in the direction of the arrow b, as shown in Fig. 2. As this takes place the threaded engagement of the portion 44 of the shaft 27 with the nut 51 will cause the thrust sleeve 46 to move outwardly in the direction of the arrow c, as shown in Fig. 1, and will project it from the end of the tubular housing 43. This action will continue until the end face or shoulder 62 of the nut 51 will encounter the face 61 of the steel washer 56. The tendency will thus be for the shaft to continue to rotate while the nut binds against the end face of the washer 56. Incident to this action the washers 55 and 56 will tend to rotate with relation to each other, thus dissipating the torque force of the driven shaft 27, and will also tend to deform the disc 54 which is positioned between the washers 55. In view of the fact that the disc 54 bears against concave faces 57 of the discs 55, there will be a tendency for the outer circumference of the disc 54 to be confined between the washers while causing the material of the member 54 to flow into the concave spaces as pressure is increased and the washer 54 is deformed. This tends to prevent the increase in diameter of the washer 54 and the tendency of the washer to overflow the space between the disc 55 and bind against the inner face of the thrust sleeve 46.

It is to be pointed out that a typical installation of this particular structure requires a motor 10 having a driving speed of 3500 revolutions per minute, and that the thrust and torque forces exerted between the shoulder 62 and the washer 56 is considerable. The structure here disclosed damps this force and prevents injury to the parts. When the driven shaft 27 rotates in a counter-direction to that indicated by the arrow b in Fig. 2, the thrust sleeve 46 will move in a counter-direction to the arrow c in Fig. 1. This will continue until the shoulder 64 on the yoke 74 abuts against the outer face 63 of the outermost disc 56. The same snubbing action will then be obtained as previously described.

In actual operation of a device employing the structure here disclosed the motor 10 drives the shaft at high speed and thus with considerable force the moving mass therefore attains appreciable inertia. This may be produced by the normal driving force and speed of operation, when an overload conditions prevails or when the motor continue to drive after the end of the reciprocating stroke. Under any of the foregoing conditions the buffer structure will strike one of the stops violently and the buffer must then act to bring the relatively moving parts to rest. This requires resistance to torque force as well as thrust of considerable magnitude. In practice heretofore metal buffer elements when used alone have been shattered by these forces. It was only when yieldable resistance to torque and thrust was provided by the structure here disclosed that the problem was solved satisfactorily. In analyzing the action of this device it should be pointed out that the aforementioned forces tend to jam the parts at the ends of the structure. This makes it difficult to produce a reverse stroke since the parts are tightly set and initial driving force is not aided by inertia. The present invention makes it possible to reciprocate the thrust sleeve 46 in either direction and thereby produces a non-jamming buffer.

Referring to Fig. 4 of the drawings, it will be seen that anti-friction bearings 55' are interposed between the discs 55 and 56.

It will thus be seen that the structure here disclosed provides a rotatable screw carrying a nut and which nut is fixed to a longitudinally sliding member held against rotation, the screw carrying means for damping its rotation and the longitudinal movement of the nut at opposite ends of the travel of the longitudinal member, said action being brought about by simple and effective means which are not liable to get out of order and which will insure that the movable parts will be brought to rest promptly without strain when the opposite ends of the stroke of the longitudinal member have been reached.

While I have shown the preferred form of my invention as now known to me, it will be understood that various changes may be made in combination, construction and arrangement of parts by those skilled in the art, without departing from the spirit of my invention as claimed.

Having thus described my invention, what I claim and desire to secure by Letters Patent is:

1. A buffer structure of the character described, comprising a non-metallic deformable disc mounted upon a shaft, a pair of metallic alloy discs, one disposed on each side of the deformable disc on the shaft, and a pair of steel discs disposed upon the shaft, one against the outer face of each of the alloy discs, the bearing surfaces of said metallic discs being ground to a desired degree of smoothness.

2. A buffer structure adapted to be mounted upon a rotatable shaft which extends into a non-rotatable tubular member having reciprocable movement with relation to the shaft and carrying fixed spaced abutments between which the buffer structure is disposed, said buffer comprising a central deformable disc freely mounted upon said shaft, pairs of rigid discs freely mounted upon said shaft, a pair of said discs being disposed on each side of the deformable disc with the innermost disc bearing against the deformable discs and the rigid discs bearing against each other, said rigid discs having limited longitudinal movement upon the shaft and being free to rotate therearound whereby pressure exerted by either of said stops against an abutting rigid disc will be imparted to the deformable disc and relatively longitudinal and rotational movement between the shaft and the tubular element will be resisted.

3. The structure of claim 2 wherein the faces of the innermost rigid discs presented to the opposite side faces of the deformable disc are concave.

4. A buffer structure adapted to be mounted upon a rotatable shaft and disposed within a non-rotatable tubular element, said shaft and tubular element having relatively longitudinal movement, the tubular element carrying stops between which the buffer structure is disposed and by which relatively longitudinal movement is limited, said buffer comprising a central deformable disc freely mounted upon said shaft, pairs of rigid discs freely mounted upon said shaft, one at each end of said deformable disc, the rigid discs of each pair including a relatively soft metal disc bearing against the end face of the deformable disc and a relatively hard metal disc to encounter one of said stops, the faces of the rigid disc in each pair bearing against each other and means for limiting alternate longitudinal movement of the buffer structure on the shaft whereby engagement of a stop with one of said relatively hard discs will tend to compress the deformable disc and to resist relative longitudinal movement and relative torque between the shaft and the tubular element.

5. The structure of claim 4 wherein the faces of the relatively soft rigid discs which bear against the deformable discs are concave.

JOHN K. MORRIS.

REFERENCES CITED

The following references are of record in the file of this patent:

UNITED STATES PATENTS

| Number | Name | Date |
|---|---|---|
| 2,252,789 | Van Dorn | Aug. 19, 1941 |
| 2,349,332 | Angell | May 23, 1944 |

FOREIGN PATENTS

| Number | Country | Date |
|---|---|---|
| 39,036 | Netherlands | Sept. 15, 1936 |